Sept. 13, 1949.     L. E. YOUNG     2,481,707

FISHING LINE SINKER

Filed May 16, 1946

INVENTOR.
Leslie E. Young
BY
Murray, Sackhoff & Paddock
ATTYS

Patented Sept. 13, 1949

2,481,707

UNITED STATES PATENT OFFICE 2,481,707

FISHING LINE SINKER

Leslie E. Young, Cincinnati, Ohio

Application May 16, 1946, Serial No. 670,123

3 Claims. (Cl. 43—52)

This invention relates to improvements in fishing line sinkers and has for its particular object the provision of a sinker construction which raises the fishing line, to which it is attached, above under-water obstructions when water moves across and in contact with its body surfaces.

It is another important object of the invention to provide a sinker body of an improved form which creates rotatory movement of the sinker about its center line when said sinker is moved longitudinally through water, said rotatory and longitudinal movement creating a tendency of the sinker to rise in the water and carry the line above snags and other obstructions which usually lie on the bottom of streams and ponds.

A further object of the invention is to provide an improved fishing line sinker having the foregoing characteristics, which is readily manufactured, and has exterior surfaces which are free from projections that might otherwise become attached to obstructions or snags when the sinker is initially moved from a motionless condition upon the bottom of a body of water.

Other objects and other characteristics of the invention will be apparent from the following specification and drawings, in which.

Figure 1:
Fig. 1 is a perspective view of a fishing line with my sinker attached thereto, and showing the preferred manner of employing it.
Figure 6:
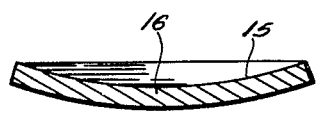
Fig. 6 is an enlarged cross-sectional view taken on line 6—6 of Fig. 2.
Figure 5:
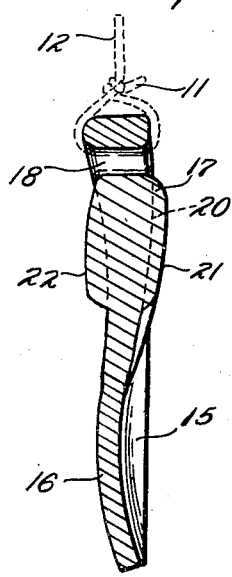
Fig. 5 is an enlarged, cross-sectional view taken on line 5—5 of Fig. 2.
Figure 4:
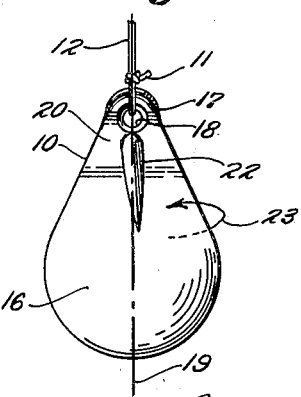
Fig. 4 is a front plan view of said sinker.

Referring now to the drawing in detail the numeral 10 indicates my sinker which as illustrated in Figs. 1, 4 and 5 is secured to the looped end 11 of a fishing line 12. A number of fishing hooks 13 may be carried by the fishing line adjacent the sinker 10 and as illustrated in Fig. 1 my sinker when moved longitudinally through the water is particularly adapted, by the means to be set forth hereinafter, to raise said hooks above obstructions 14 which generally lie on the bottom of bodies of water.

Figure 2:
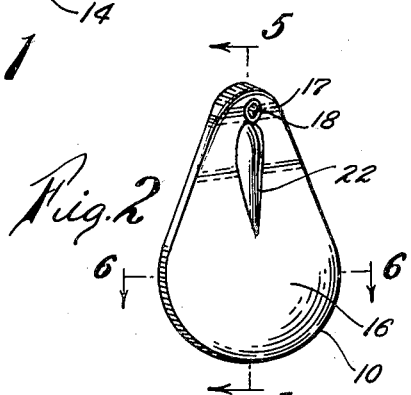
Fig. 2 is a front perspective view of my sinker.
Figure 3:
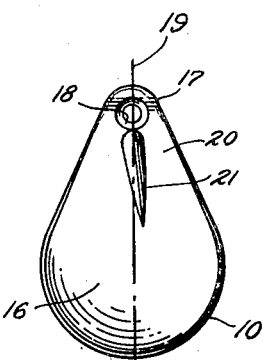
Fig. 3 is a rear plan view of said sinker.

The sinker 10 has a body 15 of substantially equal overall thickness and as illustrated in Figs. 2, 3 and 4, said body has a tear-drop contour in plan, the front face of said body being illustrated in Figs. 2 and 4 of the drawing, and its rear face being shown in Fig. 3 thereof. The wide portion 16 of the body has a concavo-convex formation whilst the narrow portion 17 is somewhat thickened relative to the transverse area of the wide portion and is provided at its upper end with a line-receiving means such as a transversely extending through-hole 18. In Figs. 3 and 4 the reference numeral 19 indicates the center line for the sinker body which defines the longitudinal center of the sinker body and it will be noted that the axial center of the through-hole intersects the said center line.

As most clearly illustrated in Fig. 5 the portion of the sinker along its longitudinal axis is in the form of a reverse curve so that the narrow portion 17 and the relatively wide portion 16 are curved in opposite directions. The connection of the sinker body with the fishing line extends the width of the aperture 18 formed in said narrow portion 17.

The concave or rear surface of the sinker body is provided with an integrally formed fin 21 which extends between the line-receiving, through-opening 18 and the wide concavo-convex body portion. The surface of the end of the fin 21 adjacent the through-hole 18 is curved with the center of the curve lying in the center line of the sinker body, and as most clearly indicated in Fig. 3 the fin is disposed longitudinally of the body and positioned at a slight angle relative to said center line. The front convex surface of the sinker body is also provided with an integral fin 22 which has one curved end lying within center line 19 and the elongated portion thereof extending longitudinally of the sinker at a slight angle to the center line. The fins 21 and 22 are inclined in the same rotatory direction with respect to the center line 19 so that when said sinker is pulled by the fishing line 12 through the water, the fins and the particular construction of the body causes the sinker to rotate in the direction of the arrow 23 (Fig. 4). It will be noted that the center line of the sinker body is an extension of the fishing line when said sinker is pulled horizontally through the water by a fisherman.

What is claimed is:

1. A fishing line sinker for attachment to the end of a fishing line consisting of a heavy body having a tear-drop contour in plan, the wide portion of said body having an imperforate, concavo-convex formation and being thin, and the narrow portion of said body being somewhat thicker than the wide portion and provided with a line attaching through hole intersecting the center line of the body, and a single fin formed on a face of the body between the hole and the wide portion and having a curved end surface, said fin being positioned at an angle to the longitudinal center line of the body with the center of the curved end surface lying on said center line.

2. A fishing line sinker comprising a body portion having a tear-drop contour in plan, and a substantially thin overall body dimension, the wide body portion having a concavo-convex form, the narrow body portion having a line receiving aperture formed transversely therethrough, said aperture having its axis lying in the center line of the body portion; and fins formed integral with the body portion on the front and back faces of the body portion and each disposed between the aperture and the wide body portion, said fins extending longitudinally of the body portion and positioned at an angle to the center line thereof in the same rotatory direction.

3. A fishing line sinker comprising a body portion having a tear-drop contour in plan, and a substantially thin overall body dimension, the wide body portion having a concavo-convex form, the narrow body portion having a line receiving aperture formed transversely therethrough, said aperture having its axis lying in the center line of the body portion; and fins formed integral with the body portion on the front and back faces of the body portion and disposed between the aperture and the wide portion thereof, the surface of the ends of the fins adjacent the aperture being curved and the curves having their centers lying in the center line of the sinker body, said fins tapering longitudinally from their curved end surfaces and positioned at an angle to the center line in the same rotatory direction.

LESLIE E. YOUNG.

REFERENCES CITED

The following references are of record in the file of this patent:

UNITED STATES PATENTS

| Number | Name | Date |
| --- | --- | --- |
| 2,043,001 | Lambrecht | June 2, 1936 |
| 2,065,246 | Saarinen | Dec. 22, 1936 |
| 2,215,764 | Okesson et al. | Sept. 24, 1940 |